March 18, 1969   E. LIESER ET AL   3,433,143
PHOTOGRAPHIC CAMERA

Filed Aug. 27, 1965   Sheet 1 of 3

ERNST LIESER
HORST SIMON
EDWIN MÜLLER
KURT STEISSLINGER
INVENTORS

ATTORNEYS

March 18, 1969 E. LIESER ET AL 3,433,143
PHOTOGRAPHIC CAMERA
Filed Aug. 27, 1965 Sheet 3 of 3

ERNST LIESER
HORST SIMON
EDWIN MÜLLER
KURT STEISSLINGER
INVENTORS

ATTORNEYS

United States Patent Office
3,433,143
Patented Mar. 18, 1969

3,433,143
PHOTOGRAPHIC CAMERA
Ernst Lieser, Horst Simon, Edwin Mueller, and Kurt Steisslinger, Stuttgart-Wangen, Germany, assignors to Eastman Kodak Company, Rochester, N.Y., a corporation of New Jersey
Filed Aug. 27, 1965, Ser. No. 505,298
Claims priority, application Germany, Aug. 27, 1964, K 53,850
U.S. Cl. 95—31  10 Claims
Int. Cl. G03b 19/04

ABSTRACT OF THE DISCLOSURE

Camera apparatus that facilitates film loading by axially attaching a film leader to a furcated take-up spool in spool chamber. Guide surfaces on the camera housing, such as the camera back, moving relative to the spool displaces the leader end back into the spool chamber.

---

The invention relates to a photographic camera for use with film supplied in rolls, films in cartridges or cassettes, respectively, with or without spool, and particularly to the manner of loading film in the camera and preparing the camera for operation.

In most known cameras the film leader must be manually fastened to the take-up spool, either before or after insertion of the film into the camera. This process is troublesome and requires a certain amount of manual dexterity. In order to avoid this shortcoming, film magazines were created having film supply and take-up chambers joined by means of connecting portions and wherein the film supply chamber contains the preloaded film and the exposed film is fed into the film take-up chamber. The use of these film magazines is limited, however, to certain camera models which are designed specifically for this purpose. The same holds true for the use of a spoolless film cassette from which film is drawn and fed by pushing into a similar spoolless film cassette.

One of the objects of the invention is to simplify the insertion and attachment of conventional films in cameras when preparing the cameras for operation. In photographic cameras adapted for use of film supplied in rolls, whether with or without spools, this object is accomplished according to the invention by inserting the leader of the film edgewise into the take-up spool rather than threading it through endwise as is the arrangement in cameras of the prior art. Preferably, the leader of the film will project beyond the core of the take-up spool, as it is being inserted into the take-up spool and will also project beyond the spool chamber which is to house the exposed film. The projecting portion is placed into the spool chamber by structure mounted for movement relative to the spool chamber, such as the camera back or a part associated therewith, and then the leader is wound around the core of the take-up spool along with the film when the film advancing mechanism is operated. By suitably designing both a take-up spool and the camera housing in accordance with the invention, the insertion and attachment of film is simplified so that the camera is substantially as easy to load as those cameras which are designed especially for use with film magazines.

Other objects of the invention will become evident from the description which follows, including reference to the accompanying drawings in which.

Figure 1:
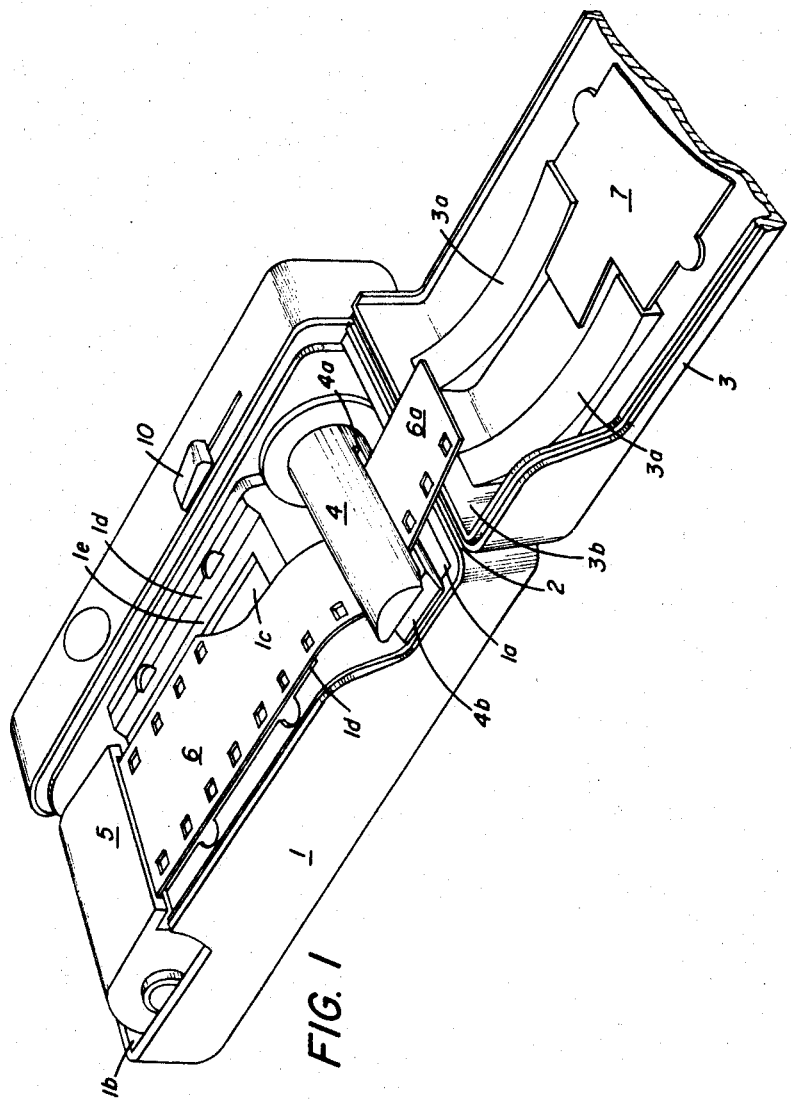
FIG. 1 illustrates a perspective view of a photographic camera with the back or cover open, a film leader passing through the slot or opening in the core of the take-up spool with a portion of the leader extending beyond the take-up spool chamber and partly into one end of the cover.

Referring to the drawings, in FIG. 1, the camera back or cover 3 is mounted on housing 1 of the camera so that it can be pivoted around hinge 2. The take-up spool 4 is disposed within spool chamber 1a and may be permanently or detachably connected to the camera housing 1. A chamber 1b lies at the opposite end of the housing from spool chamber 1a and serves to house a film cassette 5 containing the film 6. It will be appreciated, however, that the film could be provided in a roll within chamber 1b rather than in a cassette, and this would still be within the scope of the invention. In the area of the exposure plane framing unit 1c, which is disposed between the chambers 1a and 1b, the film is guided by beveled surfaces 1d and within the channel formed between the pressure plate 7 and the surface 1e surrounding the exposure plane framing unit 1c and constituting the exposure plane defining means. The camera back 3 is provided with arcuate portions 3a which preferably extend from pressure plate 7 to the front wall 3b of the camera back or cover.

In the embodiment illustrated in FIG. 1 the take-up spool 4 is provided with a slot 4a, the opening 4b of which is wider at the front side for facilitating the insertion of the film leader. The leader 6a of the film 6 which is inserted into slot 4a projects beyond spool 4 and usually also extends past the spool chamber 1a when inserted by hand. A stop (not shown) may be disposed at the camera and/or at the take-up spool, as described in a copending U.S. application Ser. No. 505,299, filed Aug. 27, 1965 based on German application K–53,849, and serves to define the position of the film leader 6a of the film relative to the exposure plane framing unit 1c. As also disclosed in the aforesaid copending application, the width of the leader 6a may indicate the sensitivity or character of the film and can be scanned by an exposure measuring and/or control system. Suitable systems are disclosed in the Bundschuh et al. U.S. Patent No. 3,135,939, issued Mar. 24, 1964, and in the copending Nagel U.S. patent application Ser. No. 259,054 filed Feb. 18, 1963. It would also be possible to control one of several exposure value setting members, such as the diaphragm and/or the exposure time, by means of the aforementioned film scanning device.

The handle 10 serves to initiate the film advancing and shutter cocking operation in a conventional manner.

The take-up spool 4 should be approximately parallel to the film guide or channel in the area of the exposure plane framing aperture unit 1c between beveled surfaces 1d when the leader 6a of the film is to be inserted. The insertion slot 4a can be automatically moved into this position by the film 6 while it is rewound. It may also be possible to secure the spool 4 so that the insertion slot will be in the proper position by some means disposed at the camera which would be controlled by the opening movement of the camera back or cover 3. This could be effected, for example, by a detent which would be disengaged when the camera back is closed or when the leader 6a of the film is inserted into the take-up spool 4. The employment of such detent would have the advantage that when the slot 4a is in a position which is unfavorable for insertion of the film, the position of the slot could be corrected by turning the take-up spool 4 while the camera back 3 is open. For improving the insertion and winding operation the core of the take-up spool preferably has a larger diameter than the core of the usual take-up spools.

The camera back or cover 3 is mounted on the camera housing 1 on the side of the spool chamber 1a for housing the exposed film so that the cover can be pivoted parallel to the axis of take-up spool 4. However, when the camera back 3 is fastened in a different manner, it is possible to provide the spool chamber 1a with means which effect the insertion of the leader 6a of the film into the spool chamber 1a prior to initiating the film advancing operation. This may be accomplished either by manual operation or by a process necessary for the operation of the camera.

The insertion of the film and the operation of the camera are effected as follows:

The cassette 5 containing film 6 is placed in the chamber 1b of the camera housing 1 when the camera back or cover 3 is opened. Then the leader 6a is manually grasped and drawn out from the cassette so that the leader can be inserted edgewise into the take-up spool 4 through the slanted opening of slot 4a by a sliding edgewise motion. In the area of the spool chamber 1a of take-up spool 4, the camera housing 1 is designed with a cut-away portion adjacent one end of the take-up spool as illustrated in FIG. 1, so that the insertion of the leader 6a into slot 4a can be effected in the manner described. A portion of the leader will then project beyond the opposite side of the camera housing. The camera back 3 is then closed. As the camera back is being closed the projecting portion of leader 6a will be placed into the spool chamber 1a by the camera back 3 or the arcuate portions 3a, respectively. The arcuate portions 3a also prevent the leader 6a of the film from moving below the pressure plate 7. The position of the leader of the film may be defined or registered, as described in the aforementioned copending U.S. application, the film sensitivity is fed into the camera, the take-up spool is released, when the camera back is closed, all in the manner described.

During the closing operation the pressure plate 7 and the beveled surfaces 1d assist in moving the film 6 which may have been laterally displaced with respect to the exposure plane framing unit 1c into the correct position with respect to the film guide or channel. When the operating handle 10 is moved for initiating the film transport and shutter cocking operation, the take-up spool 4 is turned in clockwise direction and a leader 6a of the film wound around the core of take-up spool 4 along with the film 6. When the exposed film 6 is rewound into cassette 5, the leader 6a of the film brings the position of the slot 4a automatically in alignment with the film guide or channel in the camera. It is in this position that the slot may be arrested for future loading.

Figure 2:
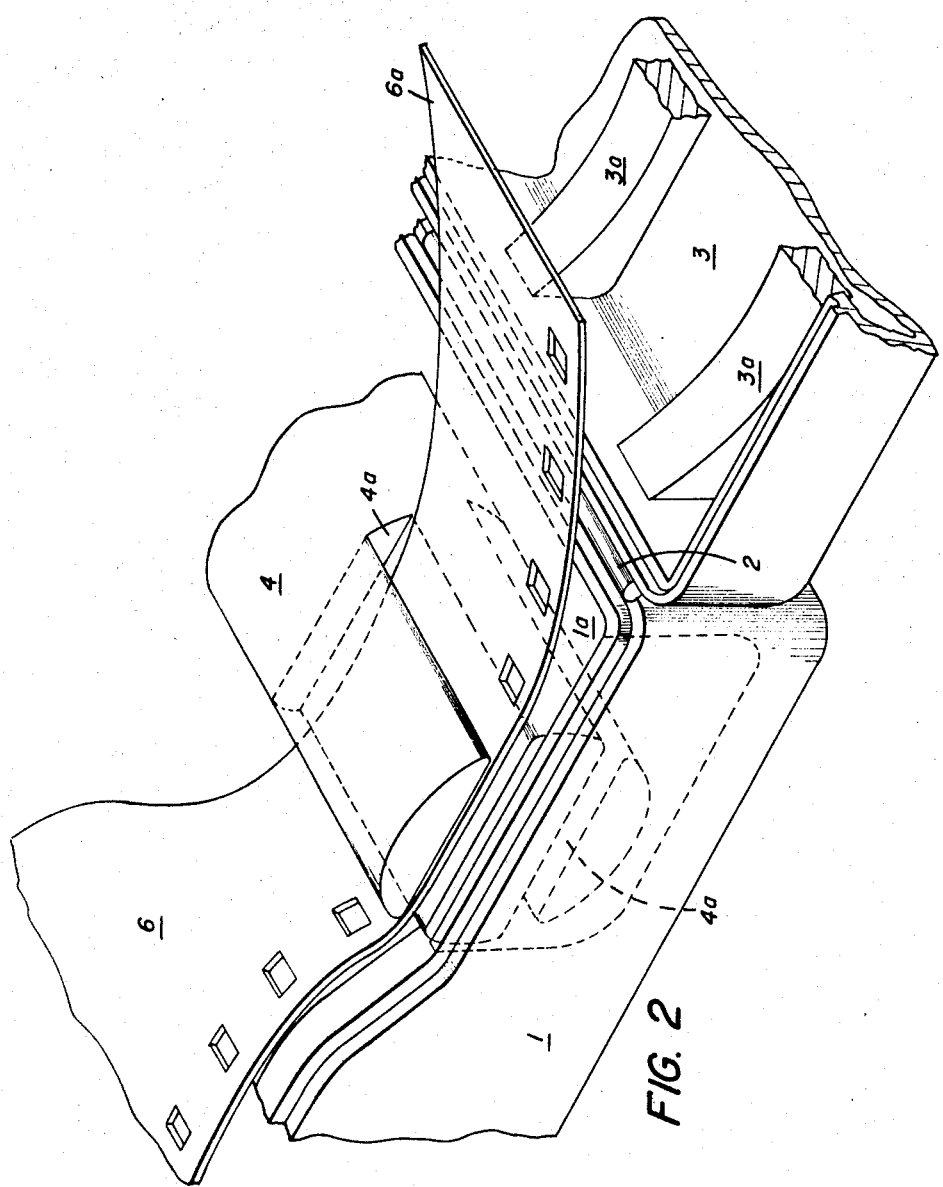
FIG. 2 is an alternate embodiment and illustrates a fractional view of a camera wherein the film leader is inserted into one of two possible slots or openings in the take-up spool.

In FIG. 2 another embodiment is illustrated showing the spool 4 being provided with a pair of slots or openings 4a, which openings 4b are wider at the front side for facilitating the insertion of the film leader. Obviously the number of slots may be greater than that shown in FIG. 2.

Figure 4:
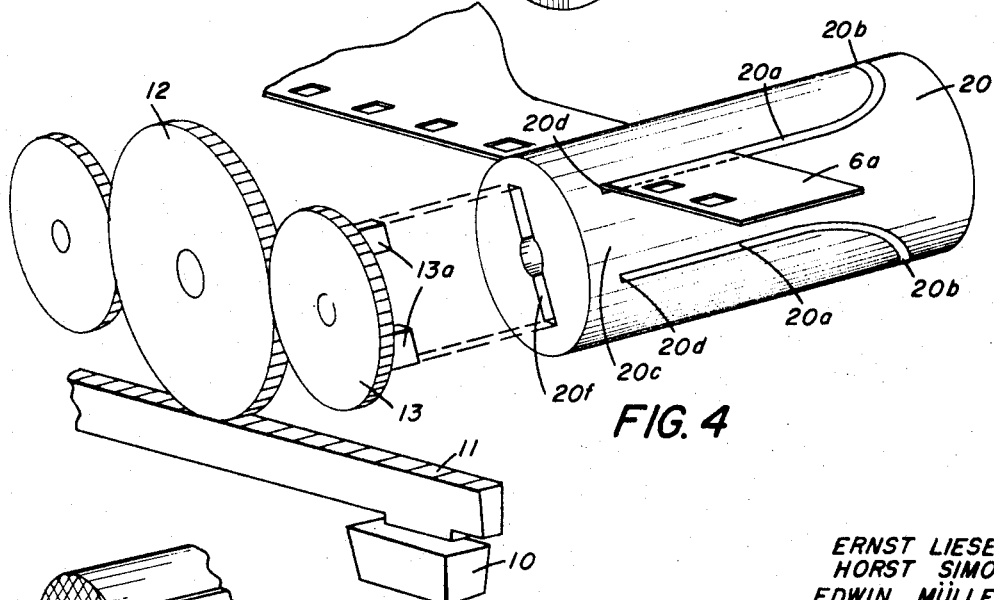
FIG. 4 illustrates still another embodiment of the take-up spool in association with part of the spool drive or film advancing mechanism.
Figure 5:
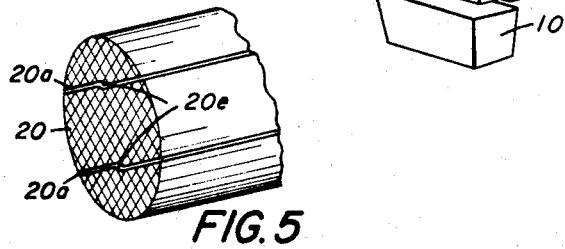
FIG. 5 is a sectional view of the partly represented take-up spool illustrated in FIG. 4.

In FIGS. 4 and 5 a further embodiment is shown wherein a take-up spool 20 may be provided with several slots 20a. The insertion opening 20b of slots 20a is located on the peripheral surface 20c of the take-up spool. Slots 20a are inclined toward the axis of the take-up spool 20 at least in the area of the insertion openings 20b. Beyond the area of the inclinations, the slots 20a then preferably extend parallel to the axis of the take-up spool 20, and the front surfaces 20d form a guide portion for defining the position of the leader 6a of the film. As is shown in the sectional view of take-up spool 20 (FIG. 5) the slots 20a can be provided with a sharp bend 20e for attaching the leader 6a of the film to or in the take-up spool, respectively.

The handle 10, shown in FIG. 4, serves to initiate the film advancing and shutter cocking operation and is connected with tooth rack 11. The rack 11 is in engagemment with gear 12 and drives gear 13 along with the spool engaging portions 13a. Engaging portions 13a mesh with slot 20f of the take-up spool, thus producing a connection between the film transport or advancing mechanism and the take-up spool 20 for rotatably driving the spool. When the handle 10 is returned to its initial position after the transport or film advancing operation and/or during the rewinding operation, a coupling (not shown) between the handle 10 and take-up spool 4 may be disconnected in a manner well known.

Figure 3:
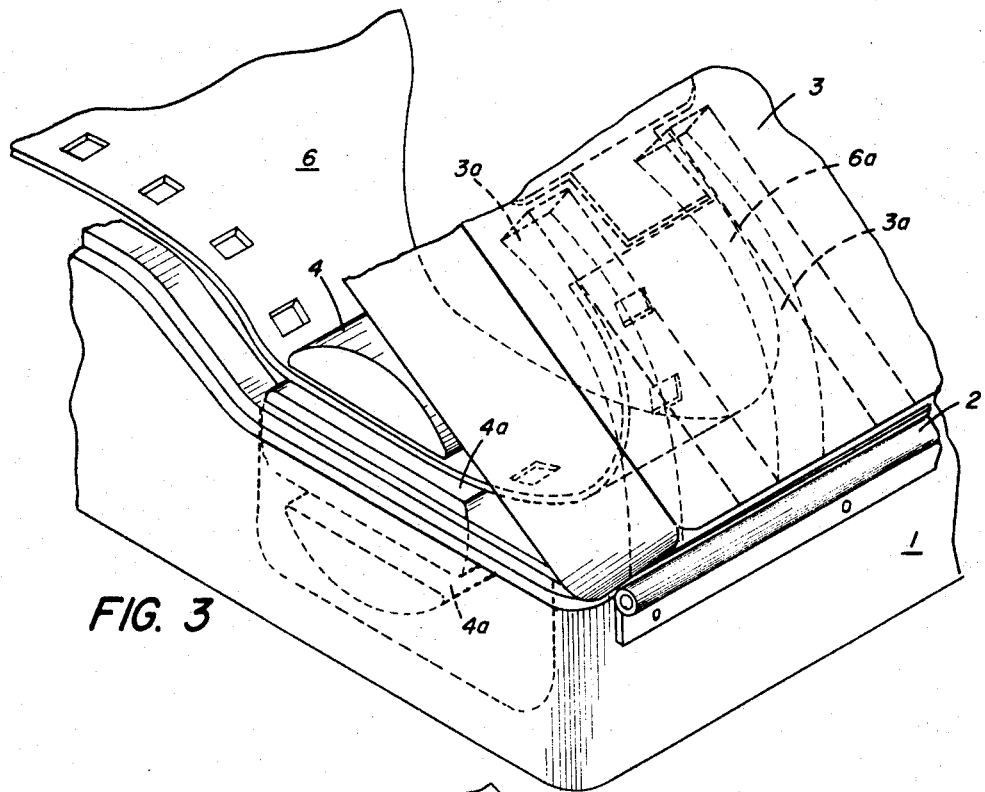
FIG. 3 is a view similar to FIG. 2 illustrating the camera back or cover in half closed position and the film leader being placed into the take-up spool chamber.

The operation of the embodiments illustrated in FIGS. 4 and 5 differ from those illustrated in FIGS. 1, 2 and 3 in that the leader is inserted by edgewise motion along the top surface of the spool, and thus a cut-away portion in the wall of the camera adjacent one end of the spool would not be essential in this embodiment.

The invention has been described in detail with particular reference to preferred embodiments thereof, but it will be understood that variations and modifications can be effected within the spirit and scope of the invention.

We claim:

1. In a camera having a housing, said housing having exposure plane framing means and wall means defining a pair of film chambers which are located on opposite sides of said framing means for receiving, respectively, (a) a roll of film provided with a leader extending from the roll, and (b) a take-up spool; the improvement comprising:

said take-up spool being furcated to form slot means extending transversely along the spool and at least a major portion of which slot means lies generally parallel to the axis of rotation of said spool;

one axial end of said slot means opening to the exterior of said spool at a location thereon such that the leader may be positively engaged with said spool by moving said leader into said slot means; and means for engaging and displacing into said takeup spool chamber, for winding onto the spool, that portion of said leader thus engaged with said slot means which extends beyond said spool chamber, said engaging and displacing means comprising a cover member for said take-up chamber movably mounted on said camera adjacent said take-up chamber and surface means positioned to engage said portion of said leader upon movement of said cover to close said take-up chamber.

2. The invention according to claim 1, said surface means comprising at least one arcuate guide portion positioned in said cover adjacent said take-up chamber in said housing.

3. In a camera having a housing, said housing having exposure plane framing means, wall means defining a pair of film chambers which are located on opposite sides of said framing means for receiving, respectively, (a) a roll of film provided with a leader extending from the roll, and (b) a take-up spool, and a movable cover member for at least said film chamber receiving said take-up spool, the improvement comprising:

said take-up spool being furcated to form slot means extending transversely along the spool and at least a major portion of which slot means lies generally parallel to the axis of rotation of said spool;

one axial end of said slot means opening to the exterior of said spool at a location thereon such that the leader may be positively engaged with said spool by moving said leader into said slot means; and guide means on the cover member, responsive to movement of said cover member, shaped to engage and fold back into said take-up spool chamber, for winding onto said take-up spool, that portion of said leader thus engaged with said slot means which extends beyond said spool chamber.

4. The invention according to claim 3, said guide means comprising at least one arcuate guide portion positioned in said cover adjacent said take-up spool chamber in said housing.

5. The invention according to claim 3, said guide means comprising at least one arcuate guide portion positioned in said cover adjacent said take-up spool chamber having a portion which is cut away, and said opening of said slot means being at one end of said spool adjacent said cut-away portion for facilitating movement of the leader by edgewise insertion of the leader in said slot means.

6. The invention according to claim 5 wherein said slot means comprises at least two slots having corresponding openings, either of which may be aligned with said cut-away portion in said wall means by rotating said take-up spool so that said leader may be inserted into said aligned opening by an edgewise movement.

7. The invention according to claim 3 wherein said opening of said slot means extends through a peripheral wall surface of said take-up spool.

8. The invention according to claim 7 wherein said slot means is provided with a sharp bend to assure positive frictional engagement of said leader.

9. The invention according to claim 3 wherein said slot means comprises at least two slots having corresponding openings into either of which said leader may be inserted by an edgewise movement.

10. The invention according to claim 9 wherein the opening of each of said slots extends through a peripheral wall surface of said take-up spool.

References Cited

UNITED STATES PATENTS

| | | | |
|---|---|---|---|
| 2,566,267 | 8/1951 | Wallace | 95—34 |
| 3,236,474 | 2/1966 | Day | 242—74 |
| 3,324,778 | 6/1967 | Everett | 95—31 |

NORTON ANSHER, *Primary Examiner.*

R. A. SCHROEDER, *Assistant Examiner.*

U.S. Cl. X.R.

242—71